(12) United States Patent
Yamaguchi et al.

(10) Patent No.: US 11,999,317 B2
(45) Date of Patent: Jun. 4, 2024

(54) INFORMATION PROCESSING APPARATUS AND INFORMATION PROCESSING METHOD

(71) Applicants: TOYOTA JIDOSHA KABUSHIKI KAISHA, Toyota (JP); DENSO CORPORATION, Kariya (JP)

(72) Inventors: Tomonari Yamaguchi, Miyoshi (JP); Masanori Kushibe, Toyota (JP); Etsuji Terauchi, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 0 days.

(21) Appl. No.: 17/931,181

(22) Filed: Sep. 12, 2022

(65) Prior Publication Data

US 2023/0089472 A1 Mar. 23, 2023

(30) Foreign Application Priority Data

Sep. 17, 2021 (JP) ................. 2021-152213

(51) Int. Cl.
*B60R 25/25* (2013.01)
*B60R 25/24* (2013.01)

(52) U.S. Cl.
CPC ............ *B60R 25/252* (2013.01); *B60R 25/24* (2013.01); *B60R 25/25* (2013.01); *B60R 2325/103* (2013.01); *B60R 2325/205* (2013.01)

(58) Field of Classification Search
CPC ....... B60R 25/252; B60R 25/24; B60R 25/25; B60R 2325/103; B60R 2325/205
See application file for complete search history.

(56) References Cited

U.S. PATENT DOCUMENTS

| 2003/0051147 A1* | 3/2003 | Maeda | G06V 10/776 713/168 |
| 2005/0238214 A1* | 10/2005 | Matsuda | G06V 40/12 382/124 |
| 2008/0001703 A1* | 1/2008 | Goto | H04L 9/3231 340/5.31 |
| 2012/0015636 A1* | 1/2012 | Monig | G05B 23/0218 455/414.1 |

(Continued)

FOREIGN PATENT DOCUMENTS

JP 2017-82396 A 5/2017

*Primary Examiner* — Thomas D Alunkal
(74) *Attorney, Agent, or Firm* — Oblon, McClelland, Maier & Neustadt, L.L.P.

(57) ABSTRACT

An information processing apparatus has a controller configured to identify a driver of a vehicle on the basis of at least one of the results of first authentication based on a first part of the living body of a user and second authentication based on a user device. The controller gives higher priority to the result of first authentication than the result of second authentication in the processing of identifying the driver of the vehicle. The user device may include a first communication terminal capable of functioning as an electronic key of the vehicle and a second communication terminal incapable of functioning as an electronic key of the vehicle. The controller gives higher priority to the result of authentication of the first communication terminal than the result of authentication of the second communication terminal.

16 Claims, 8 Drawing Sheets

(56) References Cited

U.S. PATENT DOCUMENTS

| | | | |
|---|---|---|---|
| 2012/0303254 A1* | 11/2012 | Kirsch | G07C 5/0808 |
| | | | 701/123 |
| 2018/0374278 A1* | 12/2018 | Molé | G07F 17/24 |
| 2020/0410073 A1* | 12/2020 | Ohashi | B60R 25/25 |
| 2021/0073367 A1* | 3/2021 | Kim | B60R 25/252 |

* cited by examiner

[Fig. 1]
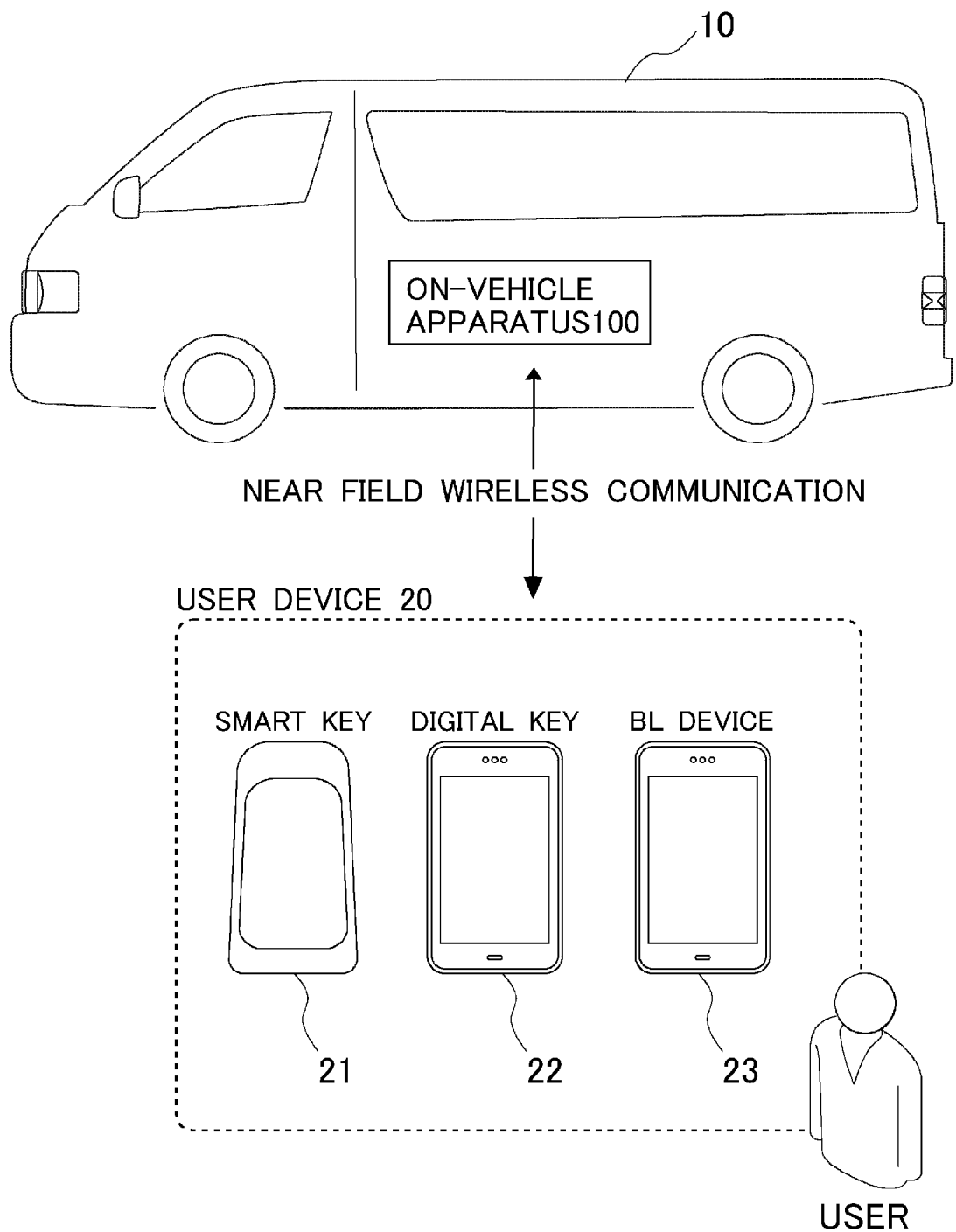

[Fig. 2]
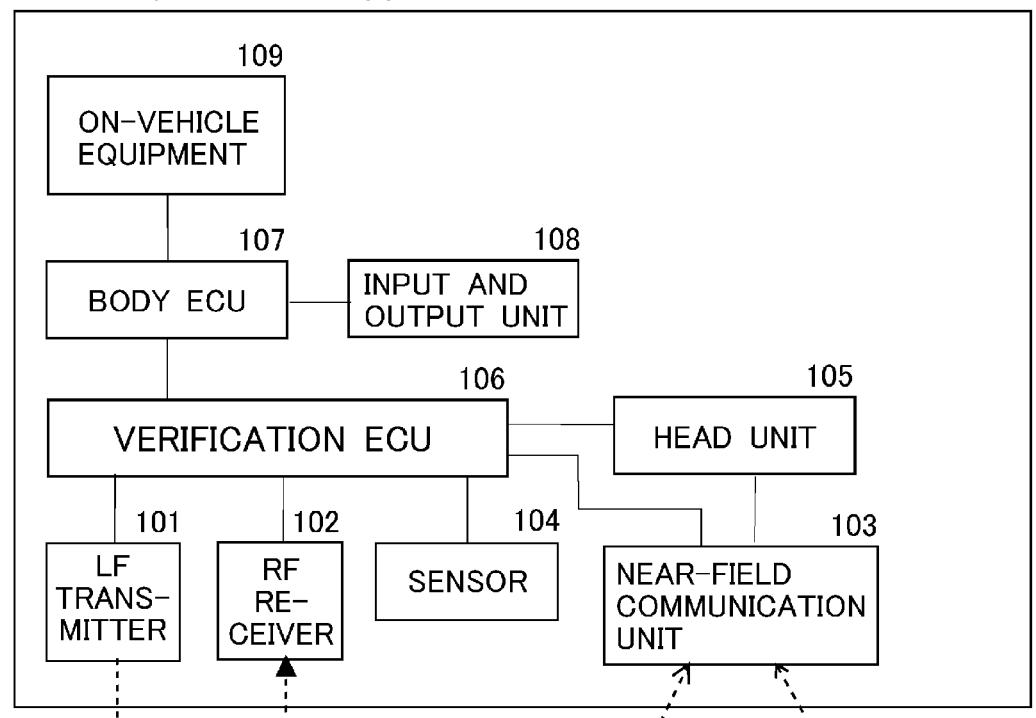
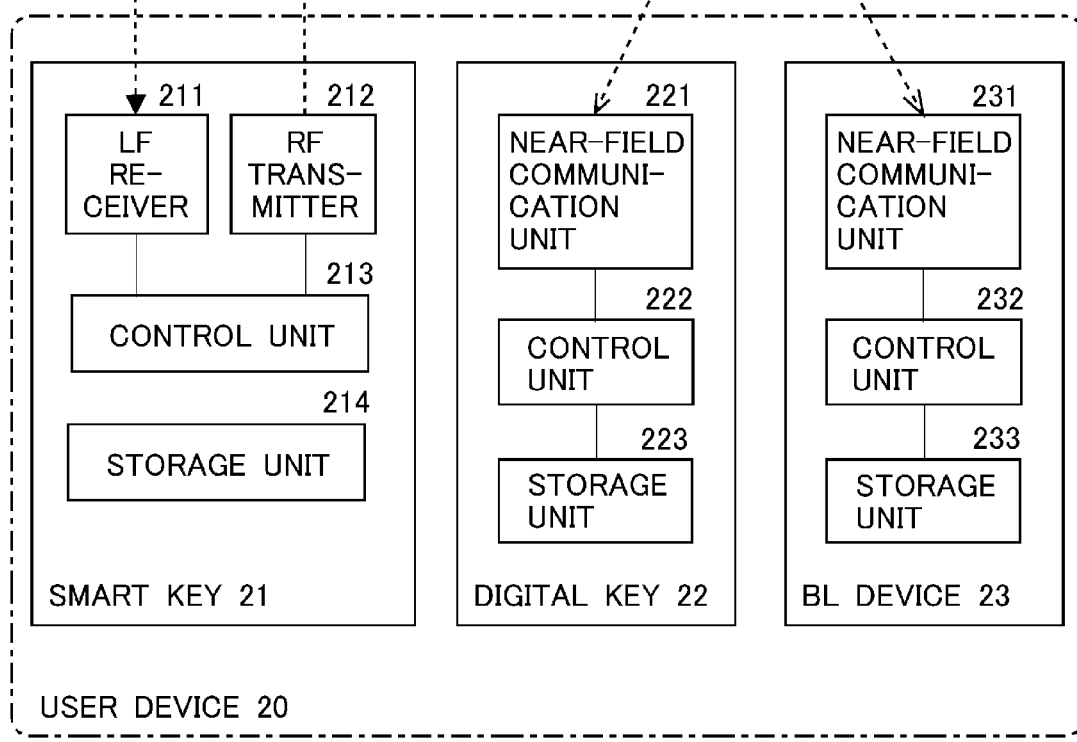

[Fig. 3]

BODY ECU 107

1071 REGISTRATION PART

1072 IDENTIFICATION PART

1073 SETTING PART

1074 DRIVER INFORMATION DB

[Fig. 4]

| USER ID | IDENTIFICATION INFORMATION | SETTING VALUE |
|---|---|---|
| U1 | ---- | ---- |
| U2 | ---- | ---- |
| U3 | ---- | ---- |

[Fig. 5]
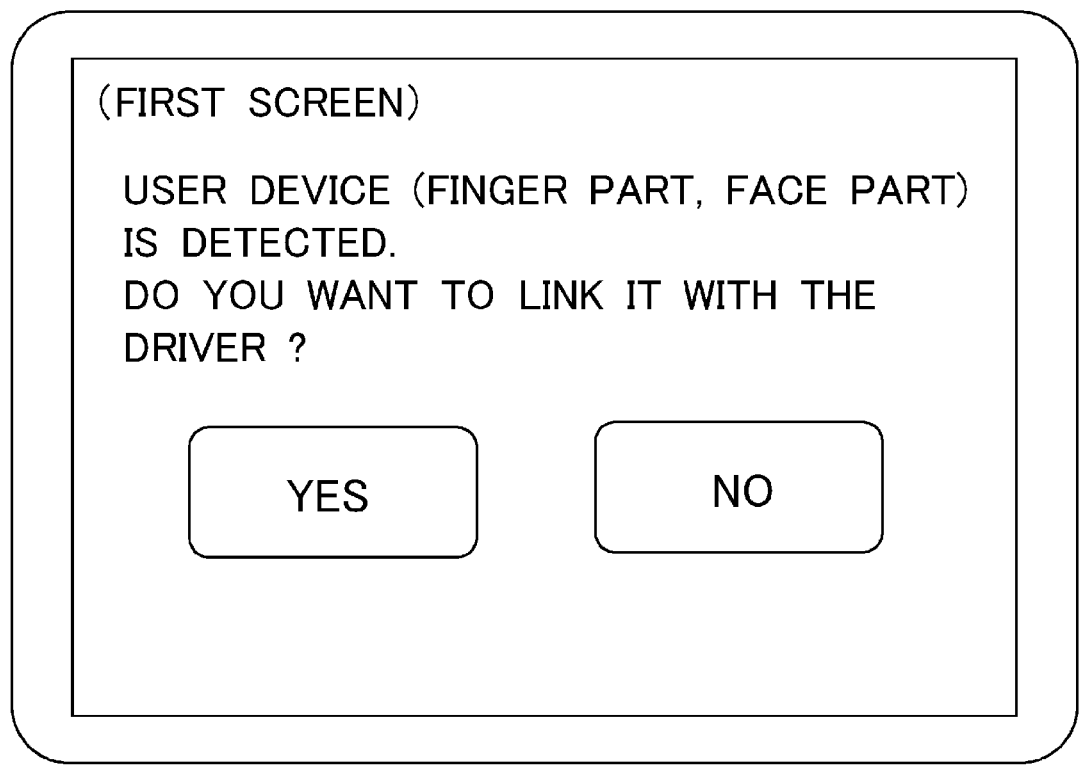
[Fig. 6]
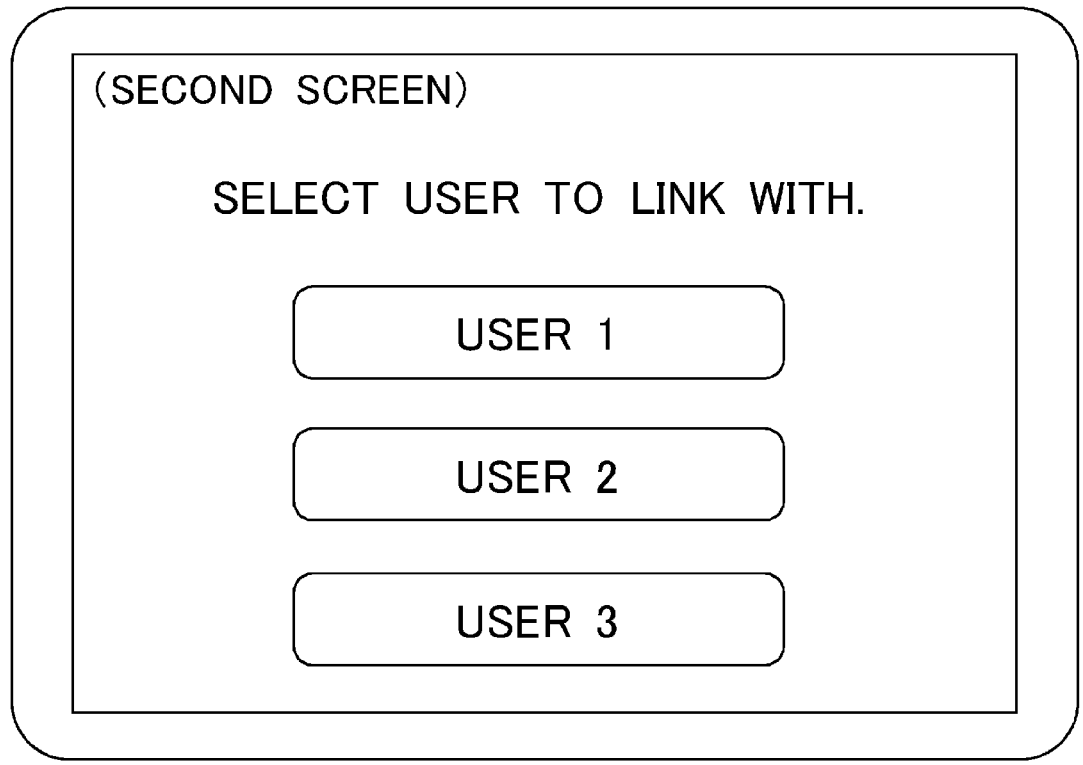

[Fig. 7]
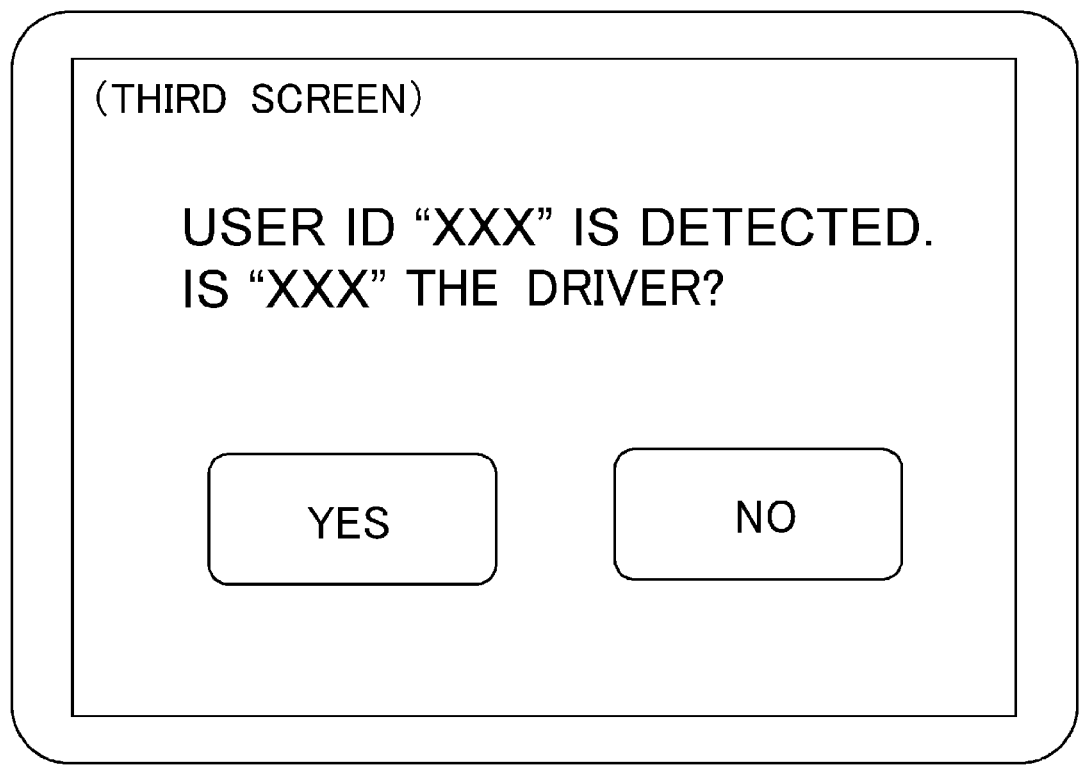

[Fig. 8]
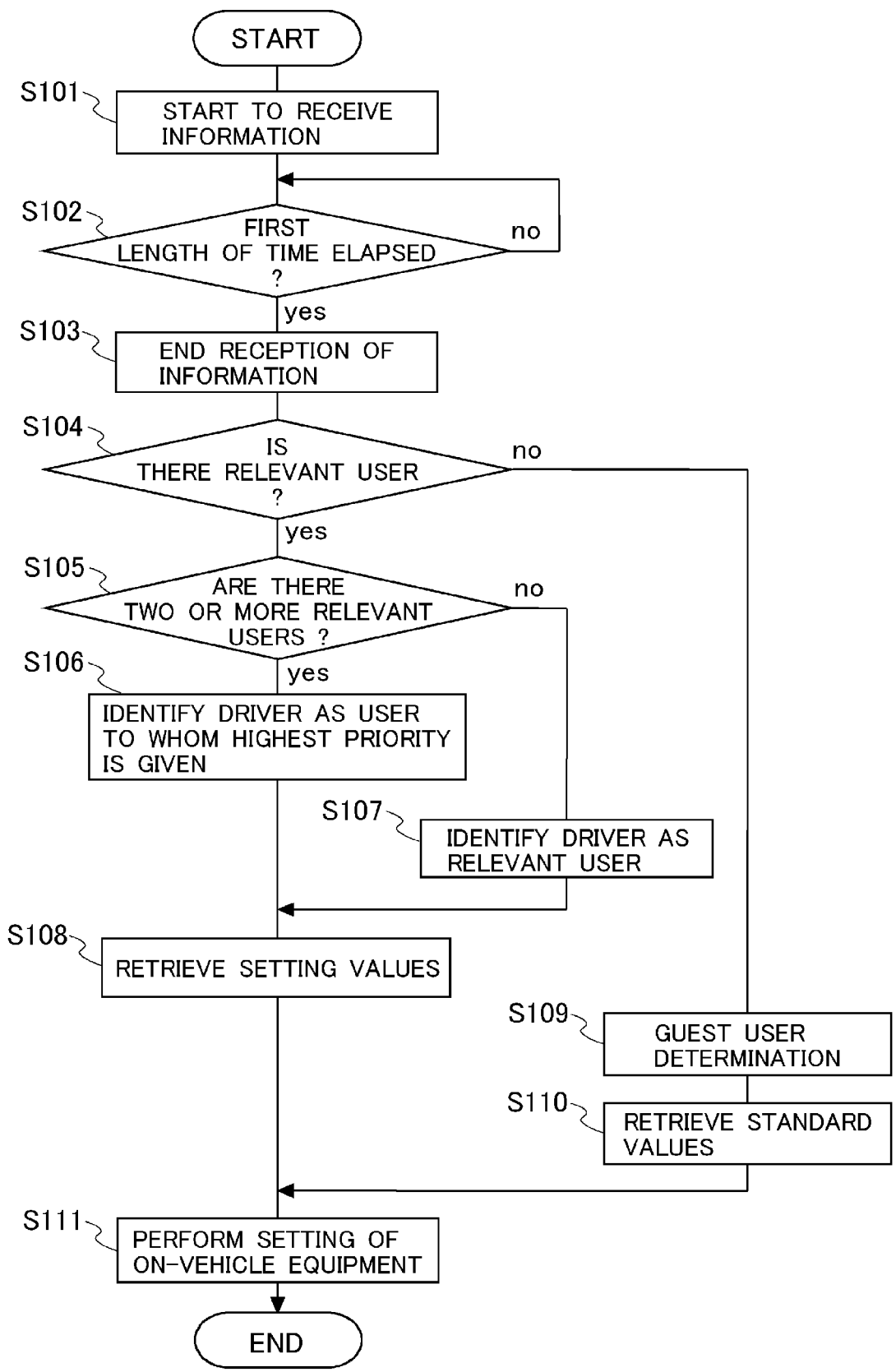

[Fig. 9]
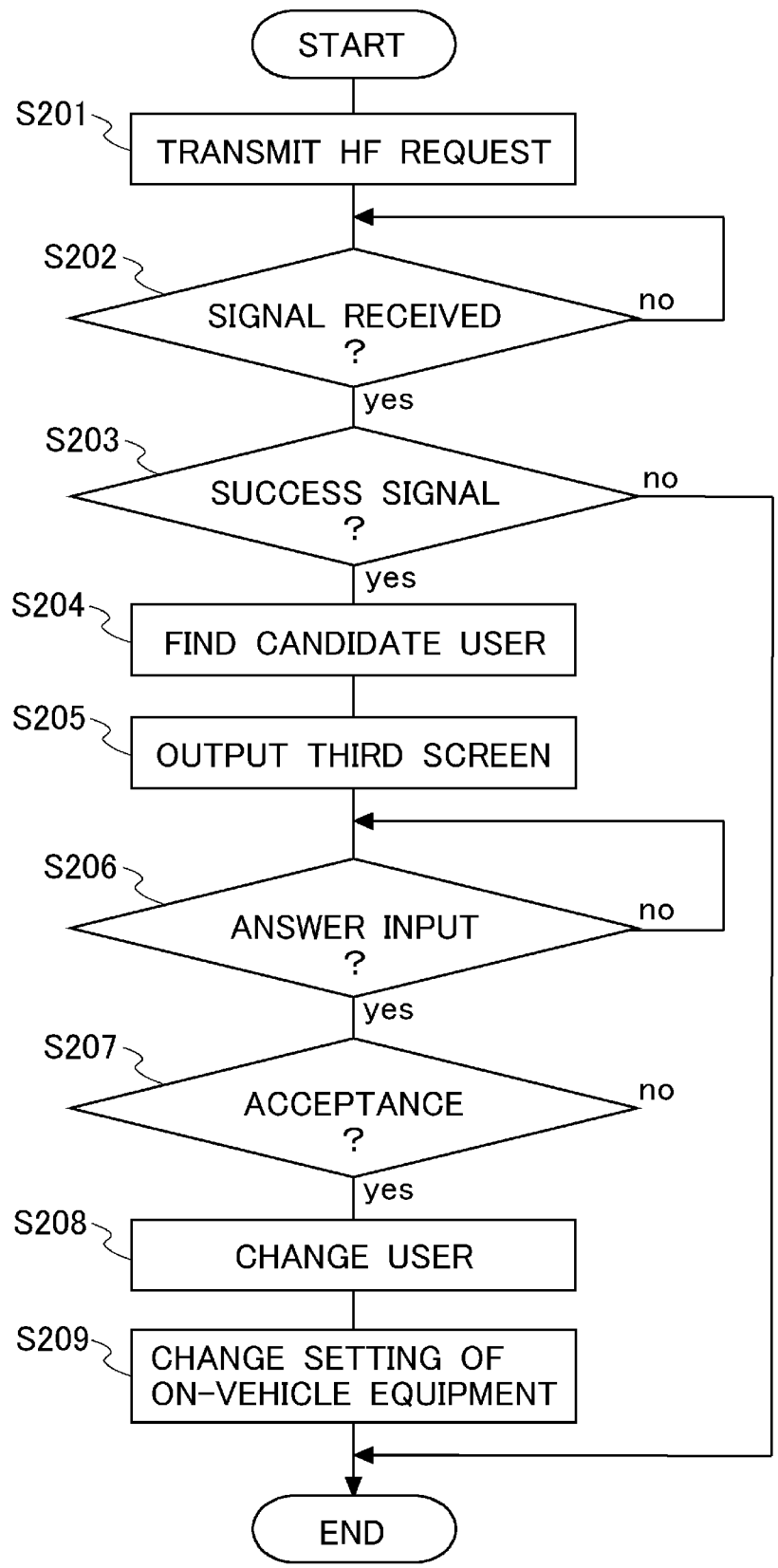

INFORMATION PROCESSING APPARATUS AND INFORMATION PROCESSING METHOD

CROSS-REFERENCE TO RELATED APPLICATIONS

This application claims the benefit of Japanese Patent Application No. 2021-152213, filed on Sep. 17, 2021, which is hereby incorporated by reference herein in its entirety.

BACKGROUND

Technical Field

The present disclosure relates to an information processing apparatus and an information processing method.

Description of the Related Art

It is known in the art to identify users who drive a vehicle by linking user devices, such as smartphones, with different users (see, for example, Patent Literature 1 in the citation list below).

CITATION LIST

Patent Literature

Patent Literature 1: Japanese Patent Application Laid-Open No. 2017-082396

SUMMARY

An object of this disclosure is to provide a technology with which it is possible to identify a user who drives a vehicle with improved accuracy.

In an aspect of the present disclosure, there is provided an information processing apparatus. The information processing apparatus may be, for example, an apparatus that identifies a driver of a vehicle on the basis of at least one of the results of first authentication based on a first part of the living body of a user and second authentication based on a user device. The information processing apparatus may comprise a controller including at least one processor configured to execute the processing of identifying the driver of the vehicle, and the controller may give higher priority to the result of first authentication than the result of second authentication in the processing of identifying the driver of the vehicle.

In another aspect of the present disclosure, there is provided an information processing method. The information processing method may be, for example, a method for identifying a driver of a vehicle on the basis of at least one of the results of first authentication based on a first part of the living body of a user and second authentication based on a user device, comprising identifying the driver of the vehicle by a computer. In the processing of identifying the driver of the vehicle, the computer may give higher priority to the result of first authentication than the result of second authentication.

In other aspects of the present disclosure, there are also provided a program configured to cause a computer to implement the above-described information processing method and a non-transitory storage medium in which such a program is stored.

The present disclosure can provide a technology with which it is possible to identify a user who drives a vehicle with improved accuracy.

BRIEF DESCRIPTION OF DRAWINGS

FIG. 1 is a diagram illustrating the general configuration of a driver identification system.

FIG. 2 is a diagram illustrating exemplary hardware configurations of an on-vehicle apparatus and a user device included in the driver identification system.

FIG. 3 is a block diagram illustrating an exemplary functional configuration of a body ECU.

FIG. 4 illustrates an exemplary table structure of a driver information table stored in a driver information database.

FIG. 5 shows an example of a first screen output on a touch panel display of an input and output unit.

FIG. 6 shows an example of a second screen output on the touch panel display of the input and output unit.

FIG. 7 shows an example of a third screen output on the touch panel display of the input and output unit.

FIG. 8 is a flow chart of a processing routine executed by a body ECU, which is triggered by unlocking of the door of a vehicle.

FIG. 9 is a flow chart of a processing routine executed by a body ECU, which is triggered by the determination that the driver of the vehicle is a guest user.

DESCRIPTION OF EMBODIMENTS

The information processing apparatus disclosed herein is applied to a driver identification system. The driver identification system identifies the driver of a vehicle and adapts an in-vehicle equipment according to setting values associated with the identified driver. Examples of setting values associated with the identified driver include at least one of a setting value relating to the driving position, a setting value relating to multimedia, a setting value relating to an advanced safety system, and a setting value relating to a body system. Examples of the setting value relating to a body system include a setting value for automatic headlights, a setting value for automatic wipers, a setting value for auto-lock, a setting value for auto-unlock, a setting value for an air conditioning system, and a setting value for room lamps.

The driver identification system identifies the driver on the basis of the result of authentication, such as a biometric authentication (first authentication) based on a first part of the user's living body and a device authentication (second authentication) based on a communication terminal (user device) carried by the user. For example, in the case where the first authentication is successful, the driver of the vehicle is identified as the user who is linked with the authenticated first part. In the case where the second authentication is successful, the driver of the vehicle is identified as the user who is linked with the authenticated user device.

The user device includes a communication terminal that can function as an electronic key of a vehicle (first communication terminal) and a communication terminal that cannot function as an electronic key of a vehicle (second communication terminal). The first communication terminal has, for example, the function of locking and unlocking the doors of the vehicle and the function of starting the motor of the vehicle. Examples of the first communication terminal include a smart key and a digital key. Examples of the second communication terminal include a smartphone.

In the case where a vehicle has the function of performing both the first authentication and the second authentication, the user identified based on the result of the first authentication and the user identified based on the result of the second authentication are not always identical to each other. For example, there may be cases where the user who drives the vehicle carries a user device linked with another user. This can be the case, for example, if a user device of a certain user is used by another member of his/her family. In such cases, the user identified based on the result of the first authentication and the user identified based on the result of the second authentication are not identical to each other. Then, there is a possibility that the driver of the vehicle cannot be identified correctly.

The information processing apparatus disclosed herein has an controller configured to give higher priority to the result of the first authentication than the result of the second authentication in identifying the driver of a vehicle. The information processing apparatus may be, for example, an ECU (Electronic Control Unit) provided in the vehicle or an on-vehicle apparatus. The information processing apparatus is not limited to an apparatus provided in the vehicle, but it may be a server apparatus that can communicate with the vehicle. The controller may be, for example, a processor, such as a CPU (Central Processing Unit).

If the user identified based on the result of the first authentication and the user identified based on the result of the second authentication are not identical, the information processing apparatus disclosed herein identifies the driver of the vehicle as the user identified based on the result of the first authentication. While a user device of a certain user can be used by another user, the first part cannot be used by another user. Therefore, the identification of the user based on the result of the first authentication is more reliable than the identification of the user based on the result of the second authentication. Therefore, the information processing apparatus can identify the driver of the vehicle with improved accuracy.

The first part mentioned in the present disclosure may include, for example, a finger part of the user and a face part of the user. Then, the first authentication may include fingerprint authentication based on the finger part and the face authentication based on the face part. The vehicle to which the information processing apparatus disclosed herein is applied may be a vehicle having the function of performing fingerprint authentication and the function of performing face authentication. Then, the controller of the information processing apparatus disclosed herein may give higher priority to the result of fingerprint authentication than the result of face authentication in identifying the driver of the vehicle. This is based on the finding that the identification of the user based on the result of fingerprint authentication is more reliable than the identification of the user based on the result of face authentication. Therefore, in the case where the vehicle has the function of performing fingerprint authentication and the function of performing face authentication also, it is possible to identify the driver of the vehicle with improved accuracy.

As described above, the user device used by the user of the vehicle may include a first communication terminal that can function as an electronic key of the vehicle and a second communication terminal that cannot function as an electronic key of the vehicle. Accordingly, the second authentication according to the present disclosure may include authentication of the first communication terminal and authentication of the second communication terminal. The vehicle to which the information processing apparatus disclosed herein is applied may be a vehicle having the function of performing authentication of the first communication terminal and the function of performing authentication of the second communication terminal. Then, the controller of the information processing apparatus disclosed herein may give higher priority to the result of authentication of the first communication terminal than the result of authentication of the second communication terminal in identifying the driver of the vehicle. This is based on the finding that the identification of the user based on the result of authentication of the first communication terminal is more reliable than the identification of the user based on the result of authentication of the second communication terminal. Therefore, in the case where the vehicle has the function of performing authentication of the first communication terminal and the function of performing authentication of the second authentication terminal also, it is possible to identify the driver of the vehicle with improved accuracy.

The information processing apparatus disclosed herein may further have a storage unit in which data that links first parts with users and data that links user devices with users are stored. Then, the controller may execute the processing of identifying a first user linked with a first part of which the first authentication is successful on the basis of the data stored in the storage unit, identifying a second user linked with a user device of which the second authentication is successful on the basis of the data stored in the storage unit, and if the first user and the second user are different, identifying the driver of the vehicle as the first user. This improves the accuracy of identification of the driver of the vehicle.

The user may be allowed to freely select whether or not the first part and/or the user device is to be linked with the user. This is because there may be cases where a user who does not want the first part and/or the user device to be linked with the user drives the vehicle. There may also be cases where the first communication terminal that functions as an electronic key of the vehicle, such as a smart key, is shared by a plurality of users.

The controller of the information processing apparatus disclosed herein may be configured to execute the processing of receiving selection as to whether or not the first part and/or the user device is to be linked with the user, storing data that links the first part and/or the user device with the user in the storage unit if receiving the selection that the first part and/or the user device is to be linked with the user, and not storing data that links the first part and/or the user device with the user in the storage unit if receiving the selection that the first part and/or the user device is not to be linked with the user. Thus, the user can freely select whether or not the first part and/or the user device is to be linked with the user. This can meet the convenience of the user in circumstances where the first communication terminal is shared by a plurality of users.

In the case where the information processing apparatus is configured to allow the user to freely select whether or not the first part and/or the user device is to be linked with the user, there can be a situation in which the first part of which the first authentication is successful is not linked with any user and the user device of which the second authentication is successful is not linked with any user. There may also be cases where a limit is set to the total number of users who may be linked with first parts and users who may be linked with user devices for the purpose of security or other reasons. In other words, there may be cases where a limit is set to the number of users who can be registered as drivers of the vehicle. Then, there can be a situation in which neither data that links the first part of which the first authentication is successful with a user nor data that links the user device of which the second authentication is successful with a user is stored in the storage unit. In such a situation, it is not possible to identify the driver of the vehicle.

In connection with the above, if neither data that links the first part of which the first authentication is successful with a user nor data that links the user device of which the second authentication is successful with a user is stored in the storage unit, the controller of the information processing apparatus disclosed herein may determine that the driver of the vehicle is a guest user. Thus, the information processing apparatus can handle situations in which a user who is linked with neither the first part nor the user device drives the vehicle.

Biometric information (or fingerprint data) used in the fingerprint authentication as the first authentication is acquired by, for example, a fingerprint sensor provided on the door knob on the outer side of a door of the vehicle or a fingerprint sensor provided on the start button (i.e. the button used to start the motor) in the cabin of the vehicle. The operation of acquiring fingerprint data by the fingerprint sensor may be triggered by the operation of opening the door or the operation of starting the motor conducted by the user who drives the vehicle. Thus, the fingerprint authentication can be triggered by the operation of opening the door or the operation of starting the motor conducted by the user who drives the vehicle.

Biometric information (or image data of the face part) used in the face authentication as the first authentication is acquired by, for example, a camera provided in the cabin of the vehicle. The operation of acquiring image data of the face part by the camera is triggered by sitting of the user who drives the vehicle on the driver's seat. Thus, the face authentication can be triggered by sitting of the user who drives the vehicle on the driver's seat.

Information used in the authentication of the first communication terminal as the second authentication (e.g. a key ID assigned to the first communication terminal) is acquired by near field wireless communication between the vehicle and the first communication terminal. The near field wireless communication between the vehicle and the first communication terminal is triggered by a specific operation relating to the vehicle that is performed by the user who drives the vehicle. Examples of this specific operation relating to the vehicle include unlocking the door and starting the motor. Thus, the authentication of the first communication terminal as the second authentication can be triggered by unlocking of the door and starting of the motor by the user who drives the vehicle.

As above, the fingerprint authentication as the first authentication, the face authentication as the first authentication, and the authentication of the first communication terminal as the second authentication are triggered by events that occur during the period between unlocking of the door and starting of the motor. Therefore, even in the case where the vehicle starts to travel immediately after the start of the motor, the authentications can be completed before the vehicle starts to travel, and the identification of the driver of the vehicle based on the results of authentications can also be completed before the vehicle starts to travel.

The authentication of the second communication terminal as the second authentication is performed through, for example, a head unit that provides infotainment services. The authentication of the second communication terminal through the head unit is performed through an attempt to establish communication connection between the head unit and the second communication terminal. Specifically, if communication connection between the head unit and the second communication terminal is established, it is determined that the authentication of the second communication terminal is successful. If communication connection between the head unit and the second communication terminal is not established, it is determined that the authentication of the second communication terminal is not successful (or failed). In the case where this method is employed, the head unit attempts to establish communication connection with a second communication terminal linked with a user by data stored in the storage unit. If communication connection with the second communication terminal is established, it is determined that the authentication of the second communication terminal as the second authentication is successful. In the case where there are plurality of second communication terminals linked with users by data stored in the storage unit, if the head unit attempts to establish communication connection with the plurality of second communication terminals, there is a possibility that the authentication of the second communication terminal cannot be completed before the vehicle starts to travel. To avoid this, the head unit may attempt to establish communication connection only with a specific second communication terminal. This specific second communication terminal may be, for example, the second communication terminal that is linked with the user who was identified as the driver in the last identification process, among the second communication terminals linked with users by data stored in the storage unit.

However, if the second communication terminal linked with the user who is expected to drive the vehicle is different from the specific second communication terminal, communication connection between the second communication terminal and the head unit cannot be established, and therefore the authentication of the second communication terminal as the second authentication fails. Therefore, in the case where the user who drives the vehicle is linked only with the second communication terminal, in other words in the case where the user is not linked with the first part nor the first communication terminal, there is a possibility that the driver of the vehicle is not identified as this user.

In view of the above, after it is determined that the driver of the vehicle is a guest user, the controller of the information processing apparatus disclosed herein may attempt to establish communication connection with second communication terminals other than the specific second communication terminal among the second communication terminals linked with users. This process may be carried out through a first device that provides hands-free communication (e.g. the aforementioned head unit) as an attempt to establish communication connection based on hands-free profile. If communication connection based on hands-free profile is established between the first device and the second communication unit, the controller may output information suggesting a change from a guest user to the user (third user) linked with the second communication terminal with which communication connection has been established. The controller may receive an operation requesting a change from a guest user to the third user to change the driver of the vehicle from a guest user to the third user. Thus, the information processing apparatus can identify the driver of the vehicle correctly even in the case where the user who drives the vehicle is linked only with the second communication terminal, and the second communication terminal is different from the specific second communication terminal.

The storage unit according to the present disclosure may further stores user information including information about a user-specific setting value for equipment provided in the vehicle. The controller may set (or adapt) the equipment provided in the vehicle according to the setting value specified in the user information associated with the user identified as the driver of the vehicle. Thus, the setting value associated with the identified driver can be set automatically in the equipment provided in the vehicle.

The present disclosure may be considered to provide an information processing method that carries out the above-described process by a computer and an information processing program that causes a computer to carry out the above-described process. Such a computer constitutes the above-described information processing apparatus.

Embodiment

In the following, a specific embodiment of the technology disclosed herein will be described with reference to the drawings. It should be understood that the following description of the embodiment will be given by way of illustration, and the technology disclosed herein is not limited to the illustrative configuration of the embodiment.
(Outline of System)

FIG. 1 is a diagram illustrating the general configuration of a driver identification system to which the technology disclosed herein is applied. The driver identification system of this embodiment includes an on-vehicle apparatus 100 provided on a vehicle 10 and a user device 20 used by a user of the vehicle 10. The user device 20 includes a smart key 21, a digital key 22, and a BL device 23. While FIG. 1 shows one smart key 21, one digital key 22, and one BL device 23, the number of keys or devices may be two or more.

The on-vehicle apparatus 100 has the function of performing authentication of the user device 20, the function of identifying the driver of the vehicle 10, and the function of customizing settings of the vehicle 10 for the identified driver.

The smart key 21 is an electronic key of the vehicle 10. The digital key 22 is a user's personal terminal that can operate similarly to an electronic key of the vehicle 10. The BL device 23 is a user's personal terminal that cannot operate similarly to an electronic key of the vehicle 10.
(Hardware Configuration of System)

FIG. 2 is a diagram illustrating exemplary hardware configurations of the on-vehicle apparatus 100 and the user device 20 in the driver identification system.

(On-Vehicle Apparatus 100)

The on-vehicle apparatus 100 is an apparatus provided on the vehicle 10 to control various operations of the vehicle 10. The on-vehicle apparatus 100 partly constitutes a smart key system. The on-vehicle apparatus 100 in this illustrative case includes an LF transmitter 101, an RF receiver 102, a near field communication unit 103, a sensor 104, a head unit 105, a verification ECU 106, a body ECU 107, an input and output unit 108, and in-vehicle equipment 109.

The LF transmitter 101 can transmit radio signals in an LF (Low Frequency) band (e.g. radio waves in the range of 30 to 300 KHz). The signals transmitted by the LF transmitter 101 include a polling signal for searching for the smart key 21 and a signal requesting the smart key 21 to send a key ID assigned to the smart key 21. The latter signal will be referred to as the "request signal" hereinafter. This key ID will also be referred to as the "first key ID" hereinafter. The LF transmitter 101 is designed in such a way that radio waves emitted from the LF transmitter 101 reaches only within a limited small area around the vehicle 10 (e.g. an area within one meter from the vehicle 10).

The RF receiver 102 can receive radio signals in an RF (Radio Frequency) band (e.g. radio waves in the range of 100 MHz to 3 GHz). Signals received by the RF receiver 102 include a response signal sent from the smart key 21 in response to the polling signal, and a response signal sent from the smart key 21 in response to the request signal. The former response signal will be referred to as the "acknowledgement signal", and the latter response signal will be referred to as the "answer signal" hereinafter. The answer signal is a signal containing information about the first key ID of the smart key 21.

The near field communication unit 103 is configured to transmit/receive data to/from the digital key 22 and the BL device 23 by wireless communication based on BLE (Bluetooth LowEnergy) or NFC (Near Field Communication). (Bluetooth is a registered trademark.) For example, the near field communication unit 103 transmits by broadcast a polling signal for searching for the digital key 22 and a request signal requesting the digital key 22 to send a key ID assigned to the digital key 22. This key ID will also be referred to as the "second key ID" hereinafter. The near field communication unit 103 receives response signals responding to these signals from the digital key 22. The response signals include an acknowledgement signal responding to the polling signal and an answer signal containing information about the second key ID responding to the request signal. The key ID received from the digital key 22 is sent from the near field communication unit 103 to the verification ECU 106 through an intra-vehicle network, such as CAN (Controller Area Network).

The near field communication unit 103 also has the function of establishing communication connection based on SPP (Serial Port Profile) with the BL device 23 and communication connection based on HFP (Hands Free Profile) with the BL device 23. If the communication connections with the BL device 23 are established, the near field communication unit 103 sends identification information of the BL device 23 with which communication connection has been established to the body ECU 107 through the intra-vehicle network.

The communication range of the near field communication unit 103 is limited within the neighborhood of the vehicle 10 (e.g. within one meter from the vehicle 10).

The sensor 104 senses biometric information of the user who drives the vehicle 10. The sensor 104 in this embodiment includes a fingerprint sensor that acquires fingerprint data of the user who drives the vehicle 10 and a camera that acquires image data of the face part of the user who drives the vehicle 10 (which will also be referred to as "face image data" hereinafter). The fingerprint sensor may be provided on a doorknob on the outside of the vehicle 10 or the start button for turning on/off the accessory power and starting and stopping the motor in the cabin of the vehicle 10. The camera is set, for example, in front of the driver's seat in the cabin of the vehicle 10. The fingerprint sensor acquires fingerprint data, for example, when a finger of the user touches the doorknob while the door of the vehicle 10 is being locked or when a finger of the user touches the start button while the motor is not operating. The camera may acquire face image data, for example, when the user sits on the driver's seat. Sitting of the user on the driver's seat is detected by a seat sensor attached to the driver's seat. The fingerprint data and the face image data acquired by the sensor 104 are sent from the sensor 104 to the verification ECU 106 through the intra-vehicle network.

The head unit 105 is a device that provides infotainment services, such as multimedia, car navigation, and internet, to occupants of the vehicle 10. The head unit 105 corresponds to the first device according to the present disclosure. The head unit 105 in this embodiment has the function of attempting to establish communication connection based on SPP with a specific BL device 23 through the near field communication unit 103. This attempt is performed during the period until a first length of time elapses since unlocking of the door of the vehicle 10. This period will also be referred to as the "specific period" hereinafter. The first length of time is a length of time shorter than the average length of time from unlocking of the door of the vehicle 10 to the start of travel of the vehicle 10. The first length of time may be, for example, approximately five seconds. If communication connection with the specific BL device 23 is established during the specific period, the head unit 105 determines that authentication of the specific BL device 23 is successful. Then, the head unit 105 sends identification information of the specific BL device 23 to the body ECU 107 through the intra-vehicle network. This process may be triggered by a request sent from the body ECU 107 or unlocking of the door of the vehicle 10.

The specific BL device 23 in this embodiment may be the BL device 23 linked with the user who was identified as the driver last time among the BL devices 23 linked with the users who are registered as drivers of the vehicle 10. Alternatively, the specific BL device 23 may be the BL device 23 with which communication connection was established last time among the BL devices 23 with which the head unit 105 have established communication connection in the past.

The reason why the head unit 105 attempts to establish communication connection based on SPP only with the specific BL device 23 is that if the head unit 105 attempts to establish communication connection based on SPP with a plurality of BL devices 23, there is a possibility that the attempt cannot be completed within the aforementioned specific period.

The head unit 105 also has the function of attempting to establish communication connection based on HFP with the BL device 23 through the near field communication unit 103. This attempt may be triggered by a request sent from the body ECU 107. The targets of the attempt to establish communication connection based on HFP are the BL devices 23 other than the specific BL device 23 among the BL devices 23 linked with the users who are registered as drivers of the vehicle 10. The target BL devices 23 may be designated by the body ECU 107. If communication connection based on HFP with the BL device 23 is established successfully, the head unit 105 determines that authentication of the BL device 23 is successful. Then, the head unit 105 sends identification information of the BL device 23 of which authentication is successful to the body ECU 107 through the intra-vehicle network.

The verification ECU 106 is a small-size computer including a processor, such as a CPU (Central Processing Unit), a RAM (Random Access Memory), a ROM (Read Only Memory), an EPROM (Erasable Programmable ROM), and a flash memory.

Triggered by a specific operation relating to the vehicle performed by the user who drives the vehicle, the verification ECU 106 causes the LF transmitter 101 to transmit a polling signal. The specific operation relating to the vehicle is, for example, the operation of unlocking the door or the operation of starting the motor. If the RF receiver 102 receives the acknowledgement signal from the smart key 21, the verification ECU 106 sends the request signal to the smart key 21 through the LF transmitter 101. When the RF receiver 102 receives the answer signal containing information about the first key ID of the smart key 21, the verification ECU 106 performs authentication of the smart key 21 by comparing the first key ID and data for verification that the verification ECU 106 has. If the authentication of the smart key 21 is successful, the verification ECU 106 allows the operation of unlocking the door and the operation of starting the motor etc. If the authentication of the smart key 21 is successful, the identification information of the authenticated smart key 21 is sent from the verification ECU 106 to the body ECU 107.

The verification ECU 106 further has the function of causing the near field communication unit 103 to transmit a polling signal. This is triggered by the aforementioned specific operation relating to the vehicle. If the near field communication unit 103 receives the acknowledgement signal from the digital key 22, the verification ECU 106 sends the request signal to the digital key 22 through the near field communication unit 103. When the near field communication unit 103 receives the answer signal containing information about the second key ID of the digital key 22, the verification ECU 106 performs authentication of the digital key 22 by comparing the second key ID and data for verification that the verification ECU 106 has. If the authentication of the digital key 22 is successful, the verification ECU 106 allows the operation of unlocking the door and the operation of starting the motor etc. If the authentication of the digital key 22 is successful, the identification information of the authenticated digital key 22 is sent from the verification ECU 106 to the body ECU 107.

The authentication of the smart key 21 and the digital key 22 may be performed as a challenge-response authentication using cryptographic keys assigned to the smart key 21 and the digital key 22.

The verification ECU 106 further has the function of performing biometric authentication. This is triggered by acquisition of biometric information of the user by the sensor 104. The biometric authentication in this embodiment includes fingerprint authentication with respect to a finger part of the user and face authentication with respect to a face part of the user. The finger part and the face part of the user are examples of the first part according to the present disclosure. If fingerprint data acquired by the fingerprint sensor included in the sensor 104 is sent from the sensor 104 to the verification ECU 106, the verification ECU 106 performs the fingerprint authentication by comparing the fingerprint data received and data for verification that the verification ECU 106 has. If the fingerprint authentication is successful, the verification ECU 106 allows the user to perform operations relating to the vehicle (e.g. the operation of unlocking the door, the operation of turning on the accessory power, or the operation of starting the motor). If face image data acquired by the camera included in the sensor 104 is sent from the sensor 104 to the verification ECU 106, the verification ECU 106 performs the face authentication by comparing the face image data received and data for verification that the verification ECU 106 has. If the face authentication is successful, the verification ECU 106 allows the user to perform operations relating to the vehicle (e.g. the operation of turning on the accessory power or the operation of starting the motor). If the fingerprint authentication or the face authentication is successful, identification information assigned to the finger part of the user (finger ID) or identification information assigned to the face part of the user (face ID) is sent from the verification ECU 106 to the body ECU 107.

The data for verification used in the authentication of the smart key 21, the data for verification used in the authentication of the digital key 22, the data for verification used in the fingerprint authentication, and the data for verification used in the face authentication are stored in the storage unit (e.g. RAM, ROM, or flash memory) of the verification ECU 106.

As with the verification ECU 106, the body ECU 107 is a small-size computer including a processor, a RAM, a ROM, an EPROM, and a flash memory. The body ECU 107 is connected with the verification ECU 106 and the head unit 105 through the intra-vehicle network. The body ECU 107 performs various body controls in the vehicle 10. For example, the body ECU 107 controls the door lock actuator in response to a request from the verification ECU 106 to unlock the door of the vehicle 10.

The body ECU 107 has the function of implementing the information processing apparatus according to the present disclosure. In other words, the body ECU 107 in this embodiment has the function of performing the processing of identifying the driver of the vehicle 10. The processor of the body ECU 107 in this embodiment corresponds to the controller according to the present disclosure. The processing of identifying the driver of the vehicle 10 is performed based on information received from the verification ECU 106 and information received from the head unit 105. When a user is identified as the driver of the vehicle 10, the body ECU 107 performs setting of the in-vehicle equipment 109. The function of identifying the driver of the vehicle 10 and the function of performing setting of the in-vehicle equipment 109 will be specifically described later.

The input and output unit 108 outputs information pursuant to instructions sent from the body ECU 107, the head unit 105 and other devices and sends information input by the user to the verification ECU 106, the body ECU 107, the head unit 105, and other devices. The input and output unit 108 includes a touch panel display provided in the cabin of the vehicle 10.

The in-vehicle equipment 109 includes a driver's seat whose position and backrest angle can be adjusted electrically, a steering wheel whose tilt and telescope can be adjusted electrically, automatic headlights whose operation condition can be changed, automatic wipers whose operation condition can be changed, an advanced safety system whose operation condition can be changed, a meter display whose design can be changed, an interior lamp whose light color can be changed, an automatic lock and unlock system whose operation condition can be changed, a navigation system whose settings can be switched, an automatic air conditioner, and a power train whose drive mode can be changed.

While FIG. 2 shows only the hardware components of the in-vehicle equipment 100 to which the processing according to this embodiment relates, the hardware components of the in-vehicle equipment 100 is not limited to the components shown in FIG. 2. For example, the in-vehicle equipment 100 may include an ECU for controlling the motor and an ECU for controlling the suspension etc. in addition to the hardware components shown in FIG. 2.

(User Device 20)

The user device 20 is a device used by the user who can drive the vehicle 10. The user device 20 includes the smart key 21, the digital key 22, and the BL device 23.

The smart key 21 is an electronic key used by the user to unlock the door of the vehicle 10 or start the motor of the vehicle 10. The smart key 21 includes an LF receiver 211, an RF transmitter 212, a control unit 213, and a storage unit 214.

The LF receiver 211 can receive radio signals in an LF band. For example, the LF receiver 211 receives the polling signal and the request signal transmitted by the on-vehicle apparatus 100. The polling signal and the request signal received by the LF receiver 211 are output to the control unit 213.

The RF transmitter 212 can transmit radio signals in an RF band. For example, the RF transmitter 212 transmits the acknowledgement signal in response to the polling signal and the answer signal in response to the request signal pursuant to instructions issued by the control unit 213.

The control unit 213 is constituted by a processor, such as a CPU. The control unit 213 has the function of transmitting various signals to the on-vehicle apparatus 100 through the RF transmitter 212. For example, when the LF receiver 211 receives the polling signal from the on-vehicle apparatus 100, the control unit 213 transmits the acknowledgement signal to the on-vehicle apparatus 100 through the RF transmitter 212. When the LF receiver 211 receives the request signal from the on-vehicle apparatus 100, the control unit 213 transmits the answer signal to the on-vehicle apparatus 100 through the RF transmitter 212.

The storage unit 214 includes a RAM, a ROM, an EPROM, and a flash memory. The storage unit 214 stores various programs executed by the control unit 213 and the first key ID assigned to the smart key 21. When the answer signal is to be transmitted to the on-vehicle apparatus 100 through the RF transmitter 212, the control unit 213 reads out the first key ID stored in the storage unit 214 to create the answer signal.

While FIG. 2 shows only the hardware components of the smart key 21 to which the processing according to this embodiment relates, the hardware components included in the smart key 21 is not limited to the components shown in FIG. 2.

The digital key 22 is a small-size computer that can operate as an electronic key of the vehicle 10. In other words, the digital key 22 is a small-size computer that has functions similar to the smart key 21. The digital key 22 is a portable personal terminal owned by each user in which an application program that causes the personal terminal to operate similarly to the smart key 21 is installed. Examples of such a personal terminal include a smartphone, a tablet terminal, and a wearable terminal. The digital key 22 includes a near field communication unit 221, a control unit 222, and a storage unit 223.

The near field communication unit 221 performs near field wireless communication with the on-vehicle apparatus 100 by wireless communication based on BLE or NFC. For example, the near field communication unit 221 receives the polling signal and the request signal transmitted from the on-vehicle apparatus 100. The polling signal and the request signal received by the near field communication unit 221 are output to the control unit 222. The near field communication unit 221 transmits the acknowledgement signal in response to the polling signal and the answer signal in response to the request signal pursuant to instructions issued by the control unit 222.

The control unit 222 is constituted by a processor such as a CPU. The control unit 222 has the function of transmitting various signals to the on-vehicle apparatus 100 through the near field communication unit 221. For example, when the near field communication unit 221 receives the polling signal from the on-vehicle apparatus 100, the control unit 222 transmits the acknowledgement signal to the on-vehicle apparatus 100 through the near field communication unit 221. When the near field communication unit 221 receives the request signal from the on-vehicle apparatus 100, the control unit 222 transmits the answer signal to the on-vehicle apparatus 100 through the near field communication unit 221.

The storage unit 223 includes a RAM, a ROM, an EPROM, and a flash memory. The storage unit 223 stores various programs executed by the control unit 222 and the second key ID assigned to the digital key 22. When the answer signal is to be transmitted to the on-vehicle apparatus 100 through the near field communication unit 221, the control unit 222 reads out the second key ID stored in the storage unit 223 to create the answer signal.

While FIG. 2 shows only the hardware components of the digital key 22 to which the processing according to this embodiment relates, the hardware components included in the digital key 22 is not limited to the components shown in FIG. 2. For example, the digital key 22 includes components that are necessary to implement the functions as a smartphone, such as a communication interface for mobile communication, a touch panel display, a speaker, and a microphone, in addition to the hardware components shown in FIG. 2.

The BL device 23 is a small-size computer that cannot function as an electronic key of the vehicle 10. Hence, the user who carries only the BL device 23 cannot unlock the door of the vehicle 10 or start the motor of the vehicle 10. The BL device 23 has the function of establishing communication connection based on SPP with the on-vehicle apparatus 100 and communication connection based on HFP with the on-vehicle apparatus 100. The BL device 23 is a portable personal terminal, such as a smartphone, a tablet terminal, or a wearable terminal, that is owned by each user. The BL device 23 is a personal terminal in which an application program that causes the terminal to operate similarly to the smart key 21 is not installed or execution of such an application program is restricted. The BL device 23 includes a near field communication unit 231, a control unit 232, and a storage unit 233.

The near field communication unit 231 receives a request for connection based on SPP from the on-vehicle apparatus 100. The request for connection received from the on-vehicle apparatus 100 is output to the control unit 232. The near field communication unit 231 transmits a signal responding to the request for connection to the on-vehicle apparatus 100 pursuant to instructions by the control unit 232. Moreover, the near field communication unit 231 receives an advertise signal based on HFP from the on-vehicle apparatus 100. The advertise signal received by the near field communication unit 231 is output to the control unit 232. The near field communication unit 231 transmits a signal responding to the advertise signal to the on-vehicle apparatus 100 pursuant to instructions by the control unit 232.

The control unit 232 is constituted by a processor, such as a CPU. The control unit 232 has the function of performing setting for connection based on SPP or HFP with the on-vehicle apparatus 100. For example, when the near field communication unit 231 receives a request for connection based on SPP from the on-vehicle apparatus 100, the control unit 232 performs setting for connection based on SPP with the on-vehicle apparatus 100. When the near field communication unit 231 receives an advertise signal from the on-vehicle apparatus 100, the control unit 232 performs setting for connection based on HFP with the on-vehicle apparatus 100 to send a response signal to the on-vehicle apparatus 100 through the near field communication unit 231.

The storage unit 233 includes a RAM, a ROM, an EPROM, and a flash memory. The storage unit 233 stores various programs executed by the control unit 232. The programs stored in the storage unit include SPP and HFP.

While FIG. 2 shows only the hardware components of the BL device 23 to which the processing according to this embodiment relates, the hardware components included in the BL device 23 is not limited to the components shown in FIG. 2. For example, the BL device 23 includes components that are necessary to implement the functions as a smartphone in addition to the hardware components shown in FIG. 2.

(Functional Configuration of Body ECU)

The functional configuration of the body ECU 107 will be described next with reference to FIG. 3. FIG. 3 is a block diagram illustrating an exemplary functional configuration of the body ECU 107. The body ECU 107 in this embodiment includes, as functional components, a registration part 1071, an identification part 1072, a setting part 1073, and a driver information database 1074. The body ECU 107 implements the registration part 1071, the identification part 1072, and the setting part 1073 by executing programs stored in a storage unit by a processor of the body ECU 107. The registration part 1071, the identification part 1072, and the setting part 1073 may be implemented partly or entirely by a hardware circuit(s), such as an ASIC (Application Specific Integrated Circuit) or an FPGA (Field Programmable Gate Array). The driver information database 1074 is constructed in the storage unit by a database management system program (DBMS program) executed by the processor of the body ECU 107. The driver information database 1074 may be constructed as a relational database.

Firstly, the driver information database 1074 will be described. What is stored in the driver information database 1074 is information about the users who are registered as drivers of the vehicle 10. Specifically, what is stored in the driver information database 1074 in this embodiment includes data that links the user devices 20, the users, and setting values for the in-vehicle equipment 109 and data that links the first parts (finger parts and/or face parts) of the living bodies of the users, the users, and setting values for the in-vehicle equipment 109. FIG. 4 illustrates an example of the data stored in the driver information database 1074.

In the case illustrated in FIG. 4, multiple tables prepared for the respective users are stored in the driver information database 1074. The table will also be referred to as "driver information table". In the system of this embodiment, the number of users who can be registered as drivers of the vehicle 10 is limited to three. Hence, the number of driver information tables stored in the driver information database 1074 is three. The number of users who can be registered as drivers of the vehicle 10 may be less than three or more than three.

As shown in FIG. 4, each driver information table has the fields of user ID, identification information, and setting value. What is stored in the user ID field is identification information (or user ID) of each user who is registered as a driver of the vehicle 10. The user ID may be determined by the body ECU 107 or set freely by the user.

What is stored in the identification information field is at least one of identification information of the smart key 21 linked with each user, identification information of the digital key 22 linked with each user, identification information of the BL device 23 linked with each user, identification information of the finger part (finger ID) linked with each user, and identification information of the face part (face ID) linked with each user. In the system of this embodiment, the number of users that may be linked with one smart key 21, the number of users that may be linked with one digital key 22, the number of users that may be linked with one BL device 23, the number of users that may be linked with one finger part, and the number of users that may be linked with one face part are all limited to one. However, the number of user devices 20 and the number of first parts that may be linked with one user are not limited to one.

What is stored in the setting value field is setting values for the in-vehicle equipment 109 linked with each user. Examples of the setting values stored in the setting value field include setting values relating to the position of the driver's seat, the angle of the backrest of the driver's seat, the position of the steering wheel, the condition for turning on/off the automatic headlights, the operation condition of the automatic wipers, the operation condition of the advanced safety system, the design of the meter display, the color of the interior lamp, the operation condition of the automatic lock and unlock system, setting of the navigation system, setting of the automatic air conditioner, and setting of the drive mode.

Referring back to FIG. 3, the registration part 1071 is a functional component that is implemented by executing a program stored in a ROM or other storage means by the processor of the body ECU 107. The functions of the registration part 1071 are creating the driver information tables and registering the created driver information tables in the driver information database 1074. The system of this embodiment allows each user to freely select whether or not to link the user device 20 and setting values for the in-vehicle equipment 109 with the user and whether or not to link the first part and setting values for the in-vehicle equipment 109 with the user. In other words, the user can freely select whether or not to register himself/herself as a driver of the vehicle 10.

The registration part 1071 outputs a screen that prompts the user to make the above selection on the touch panel display of the input and output unit 108 when the user gets in the vehicle 10 for the first time, when the user device 20 is detected for the first time (namely, when authentication of the user device 20 succeeds for the first time), when data for verification used in authentication of the finger part of the user is registered, or when data for verification used in authentication of the face part of the user is registered. Specifically, the registration part 1071 causes the touch panel display of the input and output unit 108 to output the first screen shown in FIG. 5. FIG. 5 shows an example of the first screen displayed on the touch panel display to prompt the above selection.

The exemplary first screen shown in FIG. 5 displays text information that prompts the user to select whether or not to link the user device 20 (or the finger or face part of the user) with the user and buttons (the "YES" and "NO" buttons in FIG. 5) that allow the user to enter his/her selection. If the "YES" button is operated in the first screen shown in FIG. 5, the registration part 1071 causes the touch panel display to output the second screen shown in FIG. 6. FIG. 6 shows an example of the second screen displayed on the touch panel display to prompt the user to select whether or not to link the user device (or the finger or face part of the user) with the user.

The exemplary second screen shown in FIG. 6 displays text information that prompts the user to select the user to link with and buttons (the "USER 1", "USER 2" and "USER 3" buttons in FIG. 6) that allow the user to select the user to link with. If either one of the "USER 1", "USER 2" and "USER 3" buttons in the second screen shown in FIG. 6 is operated, the registration part 1071 creates a driver information table that links the identification information of the user device 20 (or the finger ID or the face ID), setting values for the in-vehicle equipment 109, and the user ID of the selected user and registers the driver information table in the driver information database 1074. The information stored in the setting value field of the driver information table may be either setting values of the in-vehicle equipment 109 at the time when the user selects the aforementioned linking or setting values of the in-vehicle equipment 109 at the time when driving of the vehicle 10 by the user ends (e.g. at the time when the start switch is turned off).

In the case where the driver information table associated with the selected user has already been registered in the driver information database 1074, the registration part 1071 adds the identification information of the user device 20 (or the finger ID or the face ID) to the identification information field of this driver information table.

Referring back to FIG. 3, the identification part 1072 is a functional component that is implemented by executing a program stored in a ROM or other storage means by the processor of the body ECU 107. The identification part 1072 identifies the user who drives the vehicle 10. For example, when the body ECU 107 receives the identification information of a smart key 21 of which the authentication by the verification ECU 106 is successful, the identification part 1072 accesses the driver information database 1074 to determine whether there is a driver information table in which information identical to this identification information is stored in its identification information field. If there is a driver information table in which information identical to this identification information is stored in its identification information field, the driver of the vehicle 10 is identified as the user associated with this driver information table.

When the body ECU 107 receives the identification information of a digital key 22 of which the authentication by the verification ECU 106 is successful, the identification part 1072 accesses the driver information database 1074 to determine whether there is a driver information table in which information identical to this identification information is stored in its identification information field. If there is a driver information table in which information identical to this identification information is stored in its identification information field, the driver of the vehicle 10 is identified as the user associated with this driver information table.

When the body ECU 107 receives the finger ID of a finger part of which the authentication by the verification ECU 106 is successful, the identification part 1072 accesses the driver information database 1074 to determine whether there is a driver information table in which information identical to this finger ID is stored in its identification information field. If there is a driver information table in which information identical to this finger ID is stored in its identification information field, the driver of the vehicle 10 is identified as the user associated with this driver information table.

When the body ECU 107 receives the face ID of a face part of which the authentication by the verification ECU 106 is successful, the identification part 1072 accesses the driver information database 1074 to determine whether there is a driver information table in which information identical to this face ID is stored in its identification information field.

If there is a driver information table in which information identical to this face ID is stored in its identification information field, the driver of the vehicle 10 is identified as the user associated with this driver information table.

When the body ECU 107 receives the identification information of a BL device 23 (specific BL device 23) with which the head unit 105 has established connection based on SPP, the identification part 1072 accesses the driver information database 1074 to find a driver information table in which information identical to this identification information is stored in its identification information field and identifies the driver of the vehicle 10 as the user associated with the driver information table thus found.

It is necessary that the identification of the driver of the vehicle 10 be completed before the travel of the vehicle 10 is started or the motor is started. Hence, the identification part 1072 is configured to receive information from the verification ECU 106 and the head unit 105 only during the aforementioned specific period (i.e. the period until a first length of time elapses since unlocking of the door of the vehicle 10).

There may be cases where two or more authentications among authentication of the smart key 21, authentication of the digital key 22, authentication of the specific BL device 23, fingerprint authentication, and face authentication succeed during the aforementioned specific period. For example, if a user unlocks the door using the smart key 21, then sits on the driver's seat and operates the start button, there is a possibility that a plurality of authentications including authentication of the smart key, fingerprint authentication, and face authentication are successful. There may also be cases where at least one of the above-mentioned authentications is successful and communication connection between the head unit 105 and the specific BL device 23 is established. For example, when a user who carries the smart key 21 and the specific BL device 23 tries to drive the vehicle 10, it is possible that authentication of the smart key 21 is successful and communication connection between the head unit 105 and the specific BL device 23 is established (namely, authentication of the BL device 23 is successful). In such cases, if the smart key 21 used by the user is one borrowed from a member of the user's family, there is a possibility that the user linked with the smart key 21, the user linked with the finger part, the user linked with the face part, and the user linked with the specific BL device 23 are not identical. Then, there is a possibility that the driver of the vehicle 10 cannot be identified correctly.

Given the above situation, in the case where two or more authentications are successful or in the case where at least one of the authentication is successful and communication connection between the head unit 105 and the specific BL device is established, the identification part 1072 identifies the driver of the vehicle 10 according to the following order of priority that is set based on the reliabilities of the respective authentications.

First Priority: the user identified based on the authentication of the finger part (fingerprint authentication)

Second Priority: the user identified based on the authentication of the face part (face authentication)

Third Priority: the user identified based on the authentication of the digital key Fourth Priority: the user identified based on the authentication of the smart key Fifth Priority: the user identified based on the authentication of the BL device (i.e. the user linked with the BL device 23 with which the head unit 105 has established SPP connection).

The above order of priority is merely an example, and the order of priority is not limited to this. For example, depending on the specifications of the fingerprint sensor and the camera, there can be cases where the reliability of the face authentication is higher than the reliability of the fingerprint authentication. In such cases, the user identified based on the face authentication may be given higher priority than the user identified based on the fingerprint authentication. The BL device 23 is given lower priority than the smart key 21 because the BL device 23 cannot function as an electronic key. However, in the case where the BL device 23 is a smartphone, which is rarely lent to another user, the BL device 23 may be given higher priority than the smart key 21.

As described previously in the description of the registration part 1071, the system of this embodiment allows the user to freely select whether not to register himself/herself as a driver of the vehicle 10. As described previously in the description of the drive information database 1074, the number of users that may be registered as drivers of the vehicle 10 is limited to three. For these reasons, there can be cases where none of the identification information of the smart key 21 of which authentication by the verification ECU 106 is successful, the identification information of the digital key 22 of which authentication by the verification ECU 106 is successful, the finger ID of the finger part of which fingerprint authentication by the verification ECU 106 is successful, and the face ID of the face part of which face authentication by the verification ECU 106 is successful is linked with the user who drives the vehicle 10. In such cases, if the user who drives the vehicle 10 is not the user linked with the specific BL device 23, the identification part 1072 cannot identify the driver of the vehicle 10. In the case where the driver of the vehicle 10 cannot be identified, the identification part 1072 determines that the driver of the vehicle 10 is a guest user.

In the case where the driver of the vehicle 10 is determined to be a guest user, the identification part 1072 attempts to establish communication connection based on HFP with the BL device 23 through the head unit 105. Specifically, the identification part 1072 transmits a signal that requests an attempt to establish communication connection based on HFP to the head unit 105. This request will also be referred to as "HF request" hereinafter. The HF request contains the identification information of the BL device 23 to which connection is to be attempted. The BL device 23 to which connection is to be attempted is the BL device 23 other than the specific BL device 23 among the BL devices 23 linked with the users registered in the drive information database 1074 as drivers of the vehicle. If there are a plurality of such BL devices 23, the identification information of those BL devices 23 is contained in the HF request. If communication connection based on HFP between the head unit 105 and the BL device 23 is established successfully, a signal indicating the successful establishment of communication connection is transmitted from the head unit 105 to the body ECU 107. This signal will also be referred to as "success signal" hereinafter. The success signal contains the identification information of the BL device 23 with which the head unit 105 has established communication connection based on HFP. If the establishment of communication connection based on HFP between the head unit 105 and the BL device 23 fails, a signal indicating failure in establishment of communication connection is transmitted from the head unit 105 to the body ECU 107.

If the body unit ECU 107 receives the success signal from the head unit 105, the identification unit 1072 accesses the driver information database 1074 to find a driver information table in which information identical to the identification information of the BL device 23 contained in the success signal is stored in its identification information field. Then, the identification part 1072 suggests to the user who chives the vehicle 10 a change from a guest user to the user associated with the driver information table found as above (who will also be referred to as "candidate user" hereinafter). Specifically, the identification part 1072 causes the touch panel display of the input and output unit 108 to display the third screen shown in FIG. 7. FIG. 7 shows an example of the third screen displayed on the touch panel display to make the above suggestion.

In the exemplary third screen shown in FIG. 7, text information that suggests a change from a guest user to the candidate user and buttons (the "YES" and "NO" buttons in FIG. 7) that allow the user to enter an answer to the suggestion. If the "YES" button is operated in the third screen shown in FIG. 7, the identification part 1072 changes the driver of the vehicle 10 from a guest user to the candidate user. Thus, even in cases where the driver of the vehicle 10 is a user who is linked only with a BL device 23 and the user's BL device 23 is not the specific BL device 23, it is possible to identify the driver of the vehicle 10 correctly.

If the body ECU 107 receives the failure signal from the head unit 105, the identification unit 1072 does not execute the processing of changing the driver of the vehicle 10. The candidate user mentioned above corresponds to the third user according to the present disclosure.

Referring back to FIG. 3, after the identification part 1072 identifies the user who drives the vehicle 10, the identification part 1072 passes the user ID of the identified user to the setting part 1073. In the case where the driver of the vehicle 10 is determined to be a guest user, a user ID indicating the guest user is passed from the identification part 1072 to the setting part 1073.

The setting part 1073 performs setting of the in-vehicle equipment 109 for the user identified by the identification part 1072. In the case where the user identified by the identification part 1072 is a guest user, the identification part 1073 performs setting of the in-vehicle equipment 109 based on predetermined standard values. The standard values are stored in the storage unit of the body ECU 107. In the case where the user identified by the identification part 1072 is not a guest user, the setting part 1073 accesses the driver information database 1074 to find a driver information table associated with the user ID passed from the identification part 1072. Then, the setting part 1073 reads out the setting values stored in the setting value field of the driver information table thus found and performs setting of the in-vehicle equipment 109 based on the read-out setting values. Thus, in the case where the driver of the vehicle 10 is a user who is registered as a driver of the vehicle 10, the in-vehicle equipment 109 is automatically customized with setting values suitable for the user.

(Process Performed by Body ECU)

Processes performed by the body ECU 107 in this embodiment will now be described with reference to FIGS. 8 and 9. FIG. 8 is a flow chart of a processing routine executed by the body ECU 107 that is triggered by unlocking of the door of the vehicle 10. FIG. 9 is another processing routine executed by the body ECU 107 that is triggered by the determination that the driver of the vehicle 10 is a guest user, which is made in the processing routine according to the flow chart of FIG. 8. While every processing in the processes according to the flow charts of FIGS. 8 and 9 is executed by the processor of the body ECU 107, functional components of the body ECU 107 will be mentioned in the following description as components that execute various processing.

In the process according to the flow chart of FIG. 8, the identification part 1072 firstly starts to receive information from the verification ECU 106 and the head unit 105 (step S101). Information received from the verification ECU 106 includes one or more of the identification information of the smart key 21 of which authentication is successful, the identification information of the digital key 22 of which authentication is successful, the finger ID of the finger part of which fingerprint authentication is successful, and the face ID of the face part of which face authentication is successful. Information received from the head unit 105 is the identification information of the specific BL device 23 with which the head unit 105 has established communication connection based on SPP (successful authentication). In the case where communication connection based on SPP between the specific BL device 23 and the head unit 105 is not established, the identification part 1072 does not receive information from the head unit 105. After the completion of the processing of step S101, the identification part 1072 executes the processing of step S102 next.

In step S102, the identification part 1072 determines whether the first length of time has elapsed since the start of reception of information from the verification ECU 106 and the head unit 105. If the first length of time has not elapsed since the start of reception of information from the verification ECU 106 and the head unit 105 (a negative answer in step S102), the identification part 1072 waits until the first length of time elapses. When the first length of time elapses since the start of reception of information from the verification ECU 106 and the head unit 105 (an affirmative answer in step S102), the identification part 1072 executes the processing of step S103.

In step S103, the identification part 1072 ends reception of information from the verification ECU 106 and the head unit 105. After the completion of the processing of step S103, the identification part 1072 executes the processing of step S104 next.

In step S104, the identification part 1072 determines, on the basis of information received during the specific period (namely the period until the first length of time elapses since the start of reception of information from the verification ECU 106 and the head unit 105), whether there is a relevant user (registered user who is linked with the received information). Specifically, the identification part 1072 accesses the driver information database 1074 to determine whether there is a driver information table in which information identical to the information received during the specific period is stored in its identification information field. If there is a driver information table in which information identical to the information received during the specific period is stored in its identification information field (an affirmative answer in step S104), the processing of step S105 is executed next.

In step S105, the identification part 1072 determines whether there are a plurality of registered users who are linked with the received information. If the information received during the specific period includes a plurality of pieces of information and the registered users who are linked with the respective pieces of information are different users, the identification part 1072 determines that there are a plurality of registered users who are linked with the received information (an affirmative answer in step S105). Then, the processing of step S106 is executed next. If the information received during the specific period includes a plurality of pieces of information and the users linked with the respective pieces of information are the same user, the identification part 1072 determines that there is only one registered user who is linked with the received information (a negative answer in step S105). If the information received during the specific period includes only one piece of information and a driver information table in which information identical to that information is stored in its identification information table is stored in the driver information database 1074, the identification part 1072 determines that there is only one registered user who is linked with the received information (a negative answer in step S105). If step S105 is answered in the negative, the processing of step S107 is executed next.

In step S106, the identification part 1072 identifies the driver of the vehicle 10 as the user to whom the highest priority is given among the plurality of registered users who are linked with the received information. In step S107, the identification part 1072 identifies the driver of the vehicle 10 as the single registered user who is linked with the received information. The user ID of the user who is identified as the driver of the vehicle 10 in step S106 or S107 is passed from the identification part 1072 to the setting part 1073. Then, triggered by the reception of the user ID from the identification part 1072, the setting part executes the processing of step S108.

In step S108, the setting part 1073 accesses the driver information database 1074 to retrieve the setting values linked with the user ID received from the identification part 1072. Specifically, the setting part 1073 accesses the driver information database 1074 to find a driver information table in which information identical to the user ID received from the identification part 1072 is stored in its user ID field. Then, the setting part 1073 retrieves setting values stored in the setting value field of the driver information table found as above. After the completion of the processing of step S108, the setting part 1073 executes the processing of step S111.

In step S111, the setting part 1073 performs setting of the in-vehicle equipment 109 according to the setting values retrieved in step S108. In other words, the setting part 1073 customizes the in-vehicle equipment 109 with the setting values retrieved in step S108. After the processing of step S111 is executed, this processing routine is ended.

If it is determined in step S104 that there is not a driver information table in which information identical to the information received during the specific period is stored in its identification information field (a negative answer in step S104), the identification part 1072 executes the processing of step S109.

In step S109, the identification part 1072 determines that the driver of the vehicle 10 is a guest user. In the case where it is determined that the driver of the vehicle 10 is a guest user, the user ID of the guest user is passed from the identification part 1072 to the setting part 1073. Then, triggered by reception of the user ID of the guest user from the identification part 1072, the setting part 1073 executes the processing of step S110.

In step S110, the setting part 1073 retrieves the standard setting values from the storage device of the body ECU 107. After the completion of the processing of step S110, the setting part 1073 executes the processing of step S111. In step S111, the setting part 1073 performs setting of the in-vehicle equipment 109 according to the setting values retrieved in step S110. After the processing of step S111 is executed, this processing routine is ended.

After the processing of step S109 is executed, the process according to the flow chart of FIG. 9 is executed. In the process according to the flow chart of FIG. 9, the identification part 1072 firstly transmits the HF request to the head unit 105 (step S201). As described previously, the HF request is a signal that requests an attempt to establish communication connection based on HFP with the BL device 23. The HF request contains identification information of a BL device(s) 23 with which communication connection based on HFP is to be established. The BL device(s) 23 with which communication connection based on HFP is to be established is the BL device(s) 23 other than the specific BL device 23 among the BL devices 23 linked with the users registered in the driver information database 1074 as drivers of the vehicle 10. After the completion of the processing of step S201, the identification part 1072 executes the processing of step S202.

In step S202, the identification part 1072 determines whether the body ECU 107 has received a signal from the head unit 105. This signal is either the aforementioned success signal or the failure signal. If the body ECU 107 has not received a signal from the head unit 105 (a negative answer in step S202), the identification part 1072 waits until the body ECU 107 receives a signal from the head unit 105. If the body ECU 107 has received a signal from the head unit 105 (an affirmative answer in step S202), the identification part 1072 executes the processing of step S203.

In step S203, the identification part 1072 determines whether the signal received from the head unit 105 is the success signal. If the signal received from the head unit 105 is the failure signal (a negative answer in step S203), the processing routine according to the flow chart of FIG. 9 is ended. If the signal received from the head unit 105 is the success signal (an affirmative answer in step S203), the identification part executes the processing of step S204.

In step S204, the identification part 1072 accesses the driver information database 1074 using the identification information contained in the success signal (i.e. the identification information of the BL device 23 with which the head unit 105 has established communication connection based on HFP) as an argument to find a driver information table in which information identical to this identification information is stored in its identification information field (in other words, find a candidate user). After the completion of the processing of step S204, the identification part 1072 executes the processing of step S205.

In step S205, the identification part 1072 outputs the aforementioned third screen shown in FIG. 7 on the touch panel display of the input and output unit 108. The third screen is a screen that suggests a change from a guest user to the candidate user found in step S204. After the completion of the processing of step S205, the identification part 1072 executes the processing of step S206.

In step S206, the identification part 1072 determines whether an answer to the above suggestion is input. In other words, the identification part 1072 determines whether the operation of selecting the "YES" button or the "NO button" is conducted in the third screen shown in FIG. 7. If an answer to the above suggestion is not input (a negative answer in step S206), the identification part 1072 waits until an answer to the above suggestion is input. If an answer to the above suggestion is input (an affirmative answer in step S206), the identification part 1072 executes the processing of step S207 next.

In step S207, the identification part 1072 determines whether the input answer is an answer accepting the above suggestion. In other word, the identification part 1072 determines whether the "YES" button is operated in the third screen shown in FIG. 7. If the "NO" button is operated in the third screen shown in FIG. 7 (a negative answer in step S207), the execution of the processing routine according to the flow chart of FIG. 9 is ended. If the "YES" button is operated in the third screen shown in FIG. 7 (an affirmative answer in step S207), the identification part 1072 executes the processing of step S208 next.

In step S208, the identification part changes the driver of the vehicle 10 from a guest user to the candidate user found in step S204. In other words, the identification part 1072 requests the setting part 1073 to change the setting of the in-vehicle equipment 109 from setting for a guest user to setting for the candidate user found in step S204. After receiving this request, the setting part 1073 executes the processing of step S209.

In step S209, the setting part 1073 changes the setting of the in-vehicle equipment 109 according to the above request. Specifically, the setting part 1073 accesses the driver information table associated with the candidate user found in step S204 to retrieve setting values stored in its setting value field. The setting part 1073 changes the setting of the in-vehicle equipment 109 according to the retrieved setting values. After the execution of the processing of step S209, the execution of this processing routine is ended.

The vehicle 10 according to this embodiment has the function of identifying the driver based on the result of authentication of the user device 20 and the function of identifying the driver based on the result of authentication of the first part (i.e. the finger part and the face part) of the user's body. In the process of identifying the driver, higher priority is given to the result of authentication of the first part than the result of authentication of the user device 20. In consequence, it is possible to identify the driver of the vehicle 10 with improved accuracy even in circumstances where the user device 20 is lent to a member of the user's family.

The vehicle 10 according to this embodiment has the function of performing authentications (fingerprint authentication and face authentication) of a plurality of first parts (i.e. the finger part and the face part). In the process of identifying the driver, higher priority is given to the result of authentication having relatively higher reliability among the authentications. In consequence, it is possible to identify the driver of the vehicle 10 with improved accuracy even in circumstances where the authentications of a plurality of first parts are successful.

The vehicle 10 according to this embodiment has the function of performing authentications of multiple types of user devices 20 (i.e. the smart key 21, the digital key 22, and the BL device 23). In the process of identifying the driver, higher priority is given to the result of authentication of a type of user device 20 having relatively higher reliability among the plurality of types of user devices 20. In consequence, it is possible to identify the driver of the vehicle 10 with improved accuracy even in circumstances where authentications of multiple types of user devices 20 are successful.

The system of this embodiment allows the user to freely select whether or not to link the smart key 21 with the user, whether or not to link the digital key 22 with the user, whether or not to link the BL device 23 with the user, whether or not to link the finger part with the user, and whether or not to link the face part with the user. Hence, in circumstances where a user device 20 (e.g. smart key 21) that functions as an electronic key of the vehicle 10 is shared by a plurality of users, it is possible not to link the user device 20 with any user. This can prevent the in-vehicle equipment 109 from being set according to setting values for a user other than the user who drives the vehicle 10 in circumstances where the user device 20 is shared by a plurality of users.

The system of this embodiment can link a user device 20 (e.g. the BL device 23) that does not functions as an electronic key of the vehicle 10 with the user. Then, even in cases where the smart key 21 or the like is not linked with any user in circumstances where the smart key 21 or the like is shared by a plurality of users, it is possible to identify the user who drives the vehicle 10 by linking the BL device 23 with the user.

If it is determined that the driver of the vehicle 10 is a guest user, the system of this embodiment attempts to perform authentication of a BL device 23 other than the specific BL device 23 (by establishing communication connection based on HFP with the head unit 105). Thus, in cases where the user who drives the vehicle 10 is linked only with a BL device 23 that is not the specific BL device 23, it is possible to identify the driver of the vehicle 10 as this user.

<Others>

The above embodiment has been described only by way of example. The technology disclosed herein can be implemented in modified manners without departing from the essence of this disclosure. Processing and features that have been described in the above description of the embodiment may be employed in any combination so long as it is technically feasible to do so. One or some of the processes that have been described as processes performed by one apparatus may be performed by a plurality of apparatuses in a distributed manner. For example, the process performed by the body ECU 107 may be partly performed by the verification ECU 106 or the head unit 105. One or some of the processes that have been described as processes performed by two or more apparatuses may be performed by one apparatus. For example, the process performed by the body ECU 107 and the process performed by the varication ECU 106 may be performed by one ECU. The hardware configuration employed to implement various functions in a computer system may be modified flexibly.

The technology disclosed herein can be implemented by supplying a computer program(s) (i.e. information processing program) that implements the functions described in the above description of the embodiment to a computer to cause one or more processors of the computer to read and execute the program(s). Such a computer program(s) may be supplied to the computer by a computer-readable, non-transitory storage medium that can be connected to a system bus of the computer, or through a network. The computer-readable, non-transitory storage medium refers to a recording medium that can store information, such as data and programs, electrically, magnetically, optically, mechanically, or chemically in such a way as to allow the computer or the like to read the stored information. Examples of such a non-transitory, computer-readable recording medium include any type of discs including magnetic discs, such as a floppy disc (registered trademark) and a hard disk drive (HDD), and optical discs, such as a CD-ROM, a DVD, and a Blu-ray disc. The computer-readable, non-transitory storage medium may include other storage media, such as a ROM, a RAM, an EPROM, an EEPROM, a magnetic card, a flash memory, an optical card, and a solid state drive (SSD).

What is claimed is:

1. An information processing apparatus that identifies a driver of a vehicle on the basis of at least one of the results of first authentication based on a first part of the living body of a user and second authentication based on a user device, comprising a controller including at least one processor configured to execute the processing of identifying the driver of the vehicle, wherein:
the controller gives higher priority to the result of first authentication than the result of second authentication in the processing of identifying the driver of the vehicle,
the first part includes a finger part of the living body and a face of the living body,
the first authentication includes fingerprint authentication based on the finger part and face authentication based on the face part,
the controller gives higher priority to the result of fingerprint authentication than the result of face authentication in the processing of identifying the driver of the vehicle,
the user device includes a first communication terminal that functions as an electronic key of the vehicle and a second communication terminal that does not function as an electronic key of the vehicle,
the second authentication includes authentication of the first communication terminal and authentication of the second communication terminal, and
the controller gives higher priority to the result of authentication of the first communication terminal than the result of authentication of the second communication terminal in the processing of identifying the driver of the vehicle.

2. The information processing apparatus according to claim 1, further comprising a storage unit in which data that links first parts with users and data that links user devices with users are stored, wherein the controller executes the processing of:
identifying a first user linked with the first part of which the first authentication is successful on the basis of the data stored in the storage unit;
identifying a second user linked with the user device of which the second authentication is successful on the basis of the data stored in the storage unit; and
identifying the driver of the vehicle as the first user in the case where the first user and the second user are different.

3. The information processing apparatus according to claim 2, wherein the controller executes the processing of:
receiving selection as to whether or not the first part and/or the user device is to be linked with the user;
storing data that links the first part and/or the user device with the user in the storage unit in the case where the controller receives the selection that the first part and/or the user device is to be linked with the user; and
not storing data that links the first part and/or the user device with the user in the storage unit in the case where the controller receives the selection that the first part and/or the user device is not to be linked with the user.

4. The information processing apparatus according to claim 3, wherein if neither data that links the first part of which the first authentication is successful with a user nor data that links the user device of which the second authentication is successful with a user is stored in the storage unit, the controller determines that the driver of the vehicle is a guest user.

5. The information processing apparatus according to claim 4, wherein after it is determined that the driver of the vehicle is a guest user, the controller further executes the processing of:
attempting to establish communication connection with the second communication teaninal that is linked with a user by the data stored in the storage unit;
if communication connection with the second communication terminal is established, outputting information that suggests a change from the guest user to a third user linked with the second communication terminal;
receiving the operation of requesting a change from the guest user to the third user; and
changing the driver of the vehicle from the guest user to the third user.

6. The information processing apparatus according to claim 5, wherein in the processing of attempting to establish communication connection with the second communication terminal, the controller attempts to establish communication connection based on hands-free profile with the second communication terminal through a first device that provides hands-free communication.

7. The information processing apparatus according to claim 2, wherein
the storage unit further stores user information including information about a user-specific setting value relating to equipment provided in the vehicle, and
the controller performs setting of the equipment according to the user information of the user identified as the driver of the vehicle.

8. The information processing apparatus according to claim 7, wherein the setting value includes at least one of a setting value relating to the driving position, a setting value relating to multimedia, a setting value relating to an advanced safety system, and a setting value relating to a body system.

9. An information processing method for identifying a driver of a vehicle on the basis of at least one of the results of first authentication based on a first part of the living body of a user and second authentication based on a user device, comprising identifying the driver of the vehicle by a computer, wherein:
the computer gives higher priority to the result of first authentication than the result of second authentication in the processing of identifying the driver of the vehicle
the first part includes a finger part of the living body and a face of the living body,
the first authentication includes fingerprint authentication based on the finger part and face authentication based on the face part,
the computer gives higher priority to the result of fingerprint authentication than the result of face authentication in the processing of identifying the driver of the vehicle,
the user device includes a first communication terminal that functions as an electronic key of the vehicle and a second communication terminal that does not function as an electronic key of the vehicle,
the second authentication includes authentication of the first communication terminal and authentication of the second communication terminal, and
the computer gives higher priority to the result of authentication of the first communication terminal than the result of authentication of the second communication terminal in the processing of identifying the driver of the vehicle.

10. The information processing method according to claim 9, wherein the computer further comprises a storage unit in which data that links first parts with users and data that links user devices with users are stored, and the computer executes the processing of:
identifying a first user linked with the first part of which the first authentication is successful on the basis of the data stored in the storage unit;
identifying a second user linked with the user device of which the second authentication is successful on the basis of the data stored in the storage unit; and
identifying the driver of the vehicle as the first user in the case where the first user and the second user are different.

11. The infoimation processing method according to claim 10, wherein the computer executes the processing of:
receiving selection as to whether or not the first part and/or the user device is to be linked with the user:
storing data that links the first part and/or the user device with the user in the storage unit in the case where the computer receives the selection that the first part and/or the user device is to be linked with the user: and
not storing data that links the first part and/or the user device with the user in the storage unit in the case where the computer receives the selection that the first part and/or the user device is not to be linked with the user.

12. The information processing method according to claim 11, wherein if neither data that links the first part of which the first authentication is successful with a user nor data that links the user device of which the second authentication is successful with a user is stored in the storage unit, the computer determines that the driver of the vehicle is a guest user.

13. The infoimation processing method according to claim 12, wherein after it is determined that the driver of the vehicle is a guest user, the computer further executes the processing of:
attempting to establish communication connection with the second communication terminal that is linked with a user by the data stored in the storage unit;
if communication connection with the second communication terminal is established, outputting information that suggests a change from the guest user to a third user linked with the second communication terminal;
receiving the operation of requesting a change from the guest user to the third user; and
changing the driver of the vehicle from the guest user to the third user.

14. The information processing method according to claim 13, wherein in the processing of attempting to establish communication connection with the second communication terminal, the computer attempts to establish communication connection based on hands-free profile with the second communication terminal through a first device that provides hands-free communication.

15. The information processing method according to claim 10, wherein
the storage unit further stores user information including information about a user-specific setting value relating to equipment provided in the vehicle, and
the computer perforins setting of the equipment according to the user information of the user identified as the driver of the vehicle.

16. The information processing method according to claim 15, wherein the setting value includes at least one of a setting value relating to the driving position, a setting value relating to multimedia, a setting value relating to an advanced safety system, and a setting value relating to a body system.

* * * * *